March 10, 1964 R. S. EDHOUSE 3,124,034

PICTURE RECORD DISC

Filed Feb. 12, 1959 2 Sheets-Sheet 1

Inventor
R. S. Edhouse
By Glascock Downing & Seebold
Attorneys

March 10, 1964 R. S. EDHOUSE 3,124,034

PICTURE RECORD DISC

Filed Feb. 12, 1959 2 Sheets-Sheet 2

Inventor
R. S. Edhouse
By Glascock Downing & Seebold
Attorneys

United States Patent Office 3,124,034
Patented Mar. 10, 1964

3,124,034
PICTURE RECORD DISC

Ronald Sidney Edhouse, Lower Hutt City, Wellington, New Zealand (164 Oriental Parade, Box 3352, Wellington, Wellington, New Zealand)

Filed Feb. 12, 1959, Ser. No. 792,896
Claims priority, application Great Britain Feb. 19, 1958
9 Claims. (Cl. 88—16.2)

This invention relates to pictures recording and projecting apparatus.

When recording and projecting cinematographic photographs it is, of course, essential that both the picture record and the apparatus used for recording and projecting should be accurately made and should incorporate driving means such that each individual photograph passes over a viewing area in a manner such that successive images are projected for viewing onto substantially the same area. This problem becomes particularly difficult when the picture record is in the form of a rotatable disc with the photographs arranged successively in a continuous spiral on the rotatable disc.

It is therefore an object of the present invention to provide a rotatable disc carrying photographs arranged spirally thereon and picture recording and projecting apparatus which will meet this problem.

Accordingly in one aspect the invention consists in a rotatable disc wherein cinematographic photographic areas are arranged successively in a continuous spiral thereon, and wherein a drive engaging means is provided adjacent each said photographic area adapted to engage drive means forming part of a photograph on apparatus arranged to record or reproduce a photograph from each photographic area in a manner such that in use when said drive means drives said rotatable disc each photographic area is caused to pass at a substantially constant speed over a viewing area also forming part of said apparatus by engagement of the drive means of the apparatus with said drive engaging means.

In a further aspect the invention consists in apparatus for use in projecting cinematographic photographs recorded on rotatable discs according to the preceding paragraph, comprising a frame, a disc pivot slidably mounted on said frame and adapted to rotatably mount a rotatable disc, a light source and optical system adapted to project an image from a photograph on said disc when said photograph is within a viewing area and drive means adapted to engage the drive engaging means on a disc positioned on said disc pivot in a manner such as to cause each photograph to pass over said viewing area at a substantially constant speed.

One preferred form of the invention will now be described with reference to the accompanying drawings, in which.

Figure 1:
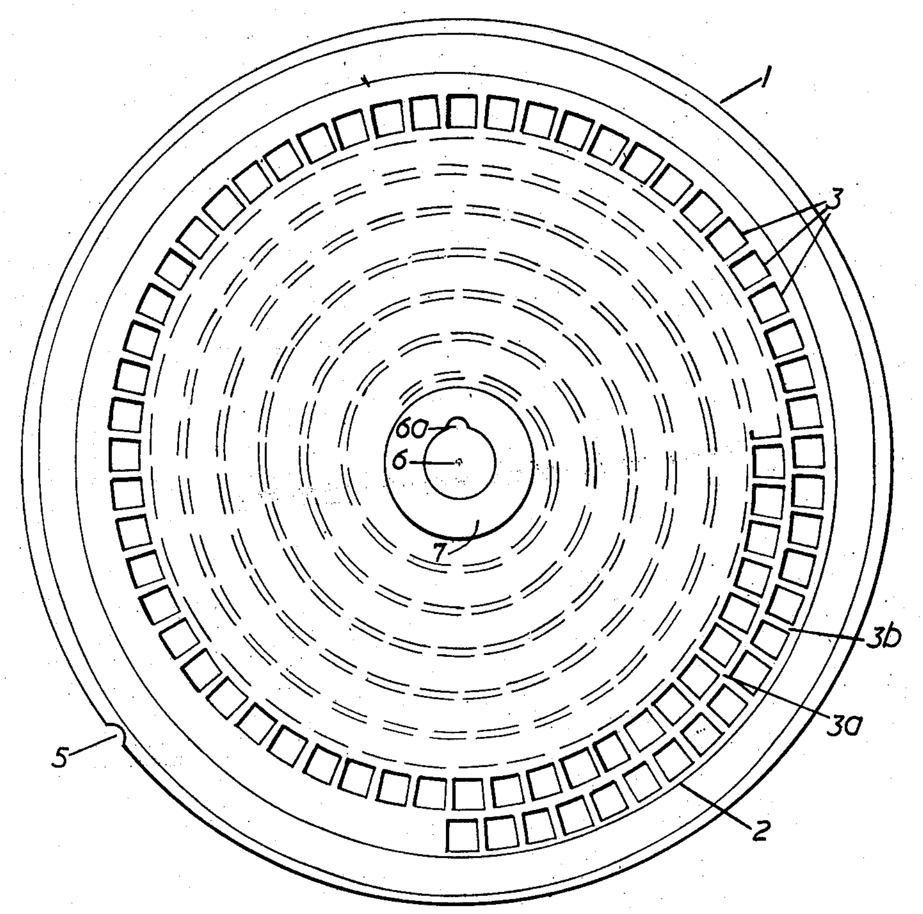
FIGURE 1 is a plan view of a rotatable disc according to the invention.
Figure 2:
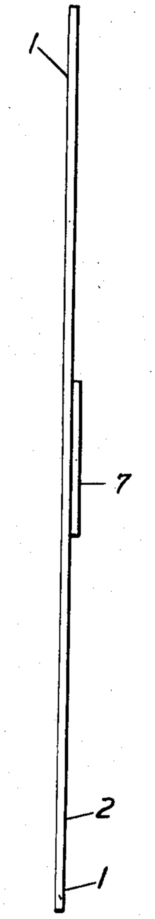
FIGURE 2 is a side elevation of FIGURE 1.
Figure 3:
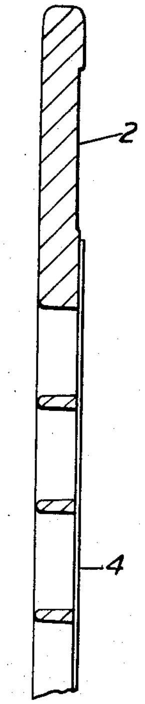
FIGURE 3 is a part section to a larger scale on a radial line in FIGURE 1.

Referring to FIGURES 1, 2 and 3 of the drawings, a rotatable disc 1 is shown having an annular area 2 near the outer edge reserved for recorded sound, the sound being provided on at least one sound track arranged in the form of at least one spiral groove, the shape of the walls of which are such as to vibrate a stylus to reproduce the sound recorded.

To provide the framework for picture records in the form of cinematographic photographs arranged successively in a continuous spiral, a frame of a rotatable disc according to the invention is moulded, cast or punched from a material such as a plastic material or combination of materials to provide apertures 3 which are preferably of approximately rectangular form and are disposed so that one axis of symmetry of each aperture lies along a radius of the disc and the other axis of symmetry is tangential to a spiral passing through the centres of all the apertures. The apertures 3 are shown separated by partitions or webs 3*b* disposed lying substantially on radial lines and these webs form the whole or part of drive engaging means adapted to engage drive means forming part of apparatus arranged to record a photograph on or reproduce a photograph from each photographic area of the disc. It will, of course, be seen that a web 3*b* is adjacent each aperture 3. On one face of the frame made as above described is affixed, by cementing, a transparent membrane shown at 4 in FIGURE 3, and on this membrane a series of transparencies for cinematographic projection are formed by photographic methods. The transparencies may be otherwise incorporated in relation to one side of the disc. Each individual photograph is, of course, positioned within an aperture 3, the confines of each aperture 3 thus providing a photographic area on the disc.

Locating means in the form of one or more depressions or key-ways are provided in the outer edge at 5 and in the bore 6 in boss 7 of the disc at 6*a* to coact with apparatus to assist in starting motion of the disc so that the first photograph on the spiral is the first to be projected. A portion of the outer edge of the disc may carry teeth locating means or depressions for engagement with locating racks or the like for accurate location of the beginning of the spiral on which the photographs are arranged.

In the area around this hole, suitable impressions may be left for automatic control when the playing of the records is terminated, and at the outer edge of the disc, opposite the ledge, there may be an impression of V-shape to guide the pick-up or sound head from the starting point.

The dimensions of the disc may depend upon the particular purpose for which it is intended; for example, a large disc with frames of relatively large size may be used for professional projection, or a small disc with smaller frames for playing in the home.

What I claim is:

1. A rotatable disc having cinematographic photographic areas arranged successively in a continuous spiral thereon, and circumferentially narrow radially extending partition means provided circumferentially between each pair of adjacent photographic areas, said partition means extending axially from the plane of said photographic areas so as to form drive engaging means to be engaged by drive means of a photographic apparatus whereby when the disc is rotatably driven the succession of photographs are reproduced in cinematic form.

2. A rotatable disc as claimed in claim 1, wherein at least one spiral sound record track is disposed on an annular part of the disc not occupied by photographic areas.

3. A rotatable disc as claimed in claim 2, wherein said sound track is disposed near the outer edge of said rotatable disc.

4. A rotatable disc as claimed in claim 2, wherein said sound track is disposed on the part of said disc between adjacent convolutions of said spiral arrangement of photographs.

5. A rotatable disc as claimed in claim 1, wherein the disc is formed from a solid material.

6. A rotatable disc as claimed in claim 1, wherein transparencies incorporating said photographs are affixed on one side of the disc.

7. A rotatable disc as claimed in claim 1 wherein locating means are provided on said disc to assist in starting said disc so that the first photograph on the spiral is the first one which passes over the viewing area in use.

8. A rotatable disc as claimed in claim 7, wherein said locating means comprise at least one depression on an edge of the disc.

9. A rotatable disc as claimed in claim 7 wherein said locating means include a boss in the center of said disc and a depression made in the boss at the centre of said disc.

References Cited in the file of this patent

UNITED STATES PATENTS

| | | |
|---|---|---|
| 1,864,519 | Boularan | June 28, 1932 |
| 1,913,913 | Boularan | June 13, 1933 |
| 1,963,079 | Duke | June 19, 1934 |
| 2,093,033 | Coullery | Sept. 14, 1937 |
| 2,203,437 | Levy | June 4, 1940 |
| 2,346,472 | Contner | Apr. 11, 1944 |
| 2,412,252 | Contner | Dec. 10, 1946 |
| 2,455,712 | Von Soden | Dec. 7, 1948 |
| 2,461,756 | Moore | Feb. 15, 1949 |
| 2,587,433 | Bentley et al. | Feb. 26, 1952 |
| 2,647,437 | Bentley et al. | Aug. 4, 1953 |

FOREIGN PATENTS

| | | |
|---|---|---|
| 710,555 | France | June 8, 1931 |